(12) United States Patent
Ding et al.

(10) Patent No.: US 11,175,402 B2
(45) Date of Patent: Nov. 16, 2021

(54) TIME-VARYING TEMPLATE FOR IMPROVED SHORT-DISTANCE PERFORMANCE IN CODED ULTRASONIC RANGING

(71) Applicant: TEXAS INSTRUMENTS INCORPORATED, Dallas, TX (US)

(72) Inventors: Lei Ding, Plano, TX (US); Srinath Mathur Ramaswamy, Murphy, TX (US); Anand Gopalan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 112 days.

(21) Appl. No.: 16/694,506

(22) Filed: Nov. 25, 2019

(65) Prior Publication Data

US 2021/0156995 A1    May 27, 2021

(51) Int. Cl.
| | |
|---|---|
| *G01S 15/931* | (2020.01) |
| *G01S 15/32* | (2006.01) |
| *G01S 15/10* | (2006.01) |
| *G01S 15/58* | (2006.01) |
| *G01S 7/527* | (2006.01) |
| *G02B 7/40* | (2021.01) |
| *B25J 19/02* | (2006.01) |
| *G01S 3/808* | (2006.01) |

(52) U.S. Cl.
CPC .......... *G01S 15/931* (2013.01); *B25J 19/026* (2013.01); *G01S 3/808* (2013.01); *G01S 7/527* (2013.01); *G01S 15/102* (2013.01); *G01S 15/325* (2013.01); *G01S 15/582* (2013.01); *G02B 7/40* (2013.01); *G01S 2015/938* (2013.01)

(58) Field of Classification Search
CPC ................................................ G01S 2015/938
See application file for complete search history.

(56) References Cited

U.S. PATENT DOCUMENTS

| | | | | |
|---|---|---|---|---|
| 7,605,744 B1 * | 10/2009 | Karhunen | ............... | G01S 13/95 342/26 R |
| 7,714,777 B2 * | 5/2010 | Fukuda | ..................... | G01S 7/35 342/175 |
| 7,978,610 B1 * | 7/2011 | McIntire | ........... | H04W 56/0065 370/236.2 |
| 8,115,672 B2 * | 2/2012 | Nouvel | .................... | G01S 13/34 342/118 |
| 9,182,478 B2 * | 11/2015 | Mukai | .................... | G01S 13/103 |
| 2005/0068226 A1 * | 3/2005 | Shinonaga | ............. | G01S 13/282 342/134 |

(Continued)

*Primary Examiner* — Isam A Alsomiri
*Assistant Examiner* — Vikas Atmakuri
(74) *Attorney, Agent, or Firm* — John R. Pessetto; Charles A. Brill; Frank D. Cimino

(57) ABSTRACT

Ultrasonic ranging systems and methods that emit coded bursts and correlate transduced acoustical echoes of the bursts with a receive template characterizing a burst code to determine time-of-flight information use receive templates of time-variable length to improve short-range object detection. The template length is based on a time index measured from the start of the burst emission. The detection can account for a dead zone of transducer ringing following a burst. A time-variable gain that is also based on the time index can be applied to the correlated signal. The length and gain can be adjusted with reduced temporal frequency to reduce computation cost.

7 Claims, 12 Drawing Sheets

(56) References Cited

U.S. PATENT DOCUMENTS

| | | | |
|---|---|---|---|
| 2009/0009384 A1* | 1/2009 | Kawano | G01S 13/10 |
| | | | 342/135 |
| 2009/0195438 A1* | 8/2009 | Kawai | G01S 13/84 |
| | | | 342/127 |
| 2011/0267924 A1* | 11/2011 | Horsky | G01S 15/325 |
| | | | 367/99 |
| 2012/0163125 A1* | 6/2012 | Pochon | G01S 15/101 |
| | | | 367/99 |
| 2012/0314541 A1* | 12/2012 | Matsuura | G01S 15/108 |
| | | | 367/94 |
| 2015/0323667 A1* | 11/2015 | Przybyla | G01S 15/10 |
| | | | 367/103 |
| 2016/0154104 A1* | 6/2016 | Schumann | G01S 15/34 |
| | | | 367/91 |
| 2017/0016981 A1* | 1/2017 | Hinderling | G01S 17/42 |
| 2019/0004172 A1* | 1/2019 | Moskovchenko | B64D 47/00 |
| 2019/0025415 A1* | 1/2019 | Suchy | G01S 15/931 |

\* cited by examiner

TIME-VARYING TEMPLATE FOR IMPROVED SHORT-DISTANCE PERFORMANCE IN CODED ULTRASONIC RANGING

TECHNICAL FIELD

This disclosure relates to electronic processing systems and methods, and particularly relates to systems and methods generating and using a time-varying template for improved short-distance performance in coded ultrasonic ranging.

BACKGROUND

Ultrasonic ranging is used in a variety of applications. For example, in an automotive application, ultrasonic transducers can be arranged in a bumper or fender of an automobile. The transducers emit ultrasonic signals that reflect off nearby objects, if present, and sense the reflections. The round-trip time of the ultrasonic signals is measured so that distance to the object can be determined or, by processing reflection information from multiple transducers, the position of the object can be deduced. Collision avoidance can thereby be achieved, e.g., by presenting such determined or deduced information, or navigation information based thereon, to a warning system configured to present a warning signal to a human driver, or to an automated driving system configured to navigate a vehicle to avoid collisions with detected obstacles.

SUMMARY

An example ultrasonic ranging system includes time-varying template generation circuitry configured to generate a time-varying coded receive template based on a full-length template and a time index from a start of a burst signal provided to an ultrasonic transducer. The length of the time-varying coded receive template depends on the time index. The system further includes correlator circuitry coupled to the time-varying template generation circuitry and configured to correlate a received transduced reflected signal with the time-varying coded receive template to produce a correlated signal. An envelope of the correlated signal contains a peak indicative of a distance between the ultrasonic transducer and a detected object. A time-varying gain amplifier can be coupled to the correlator circuitry and configured to adjust the gain of the correlated circuitry in an amount that is based on the time index from the start of the burst signal.

In another example, a method of ultrasonic ranging includes emitting from an ultrasonic transducer a coded ultrasonic acoustic burst signal coded with a code. The ultrasonic transducer or another ultrasonic transducer then transduces a reflected acoustic signal coded with the code. A time-varying receive template characterizing the code is generated. The length of the receive template is based on a time index measured from the start of the emission of the burst signal. The transduced reflected signal is correlated with the time-varying receive template to produce a correlated signal. Based on the correlated signal, a time of flight of the reflected acoustic signal is computed. This time of flight is indicative of a distance between the ultrasonic transducer and a detected object.

In yet another example, an ultrasonic detection system includes excitation circuitry configured to induce an ultrasonic transducer to emit a coded ultrasonic acoustic burst signal, coded with a code, and listening circuitry configured to the receive from the ultrasonic transducer or another ultrasonic transducer a transduced reflected acoustic signal coded with the code. The system further includes a time-varying template generator configured to generate a time-varying receive template characterizing the code, based on a time index measured from the start of the emission of the burst signal. The system further includes a correlator coupled to the listening circuitry and to the time-varying template generator and configured to correlate the transduced reflected signal with the time-varying receive template to produce a correlated signal. The system further includes time-of-flight circuitry coupled to the correlator and configured to compute a time of flight of the reflected acoustic signal based on the correlated signal, the time of flight being indicative of a distance between the ultrasonic transducer and a detected object.

DETAILED DESCRIPTION

Reflected ultrasonic signals can be detected by an ultrasonic transducer and used to measure round-trip time to thereby determine distance to an object that reflected the ultrasonic signals. For example, automotive applications can use one or more ultrasonic sensor modules to sense the distances of objects behind, along, or in front of a car. This application discloses systems and methods providing enhanced ultrasonic detection of obstacles, particularly under conditions where ranging detection targets are very near to the detection system.

Discrimination of echoes of ultrasonic signals produced by different transducers is improved by coding emitted signal bursts and processing received echoes with knowledge of such coding information. An example system for coded ultrasonic sensing is described in U.S. patent application Ser. No. 16/364,652, filed Mar. 26, 2019 and entitled "Time of Flight and Code Signature Detection for Coded Ultrasonic Transmission," herein incorporated by reference. The coding of the signal bursts improves reflection detection by distinguishing the main peaks in envelopes of correlated reflected signals, which main peaks correspond to true reflections, from peaks (main or subsidiary) corresponding to echoes sensed from other transducers. Correlator, envelope, threshold, peak search, peak buffer, and peak rank logic, arranged in a signal processing path of which multiple instances converge (e.g., one signal processing path instance for each burst code used in a ranging system, e.g., one burst code per transducer) identify valid peaks in correlator outputs. Validated peak information (e.g., amplitude and time) can be reported to a central controller and/or stored locally in fusion logic to generate more intelligent information about possible targets or obstacles using peaks from multiple bursts.

Figure 1:
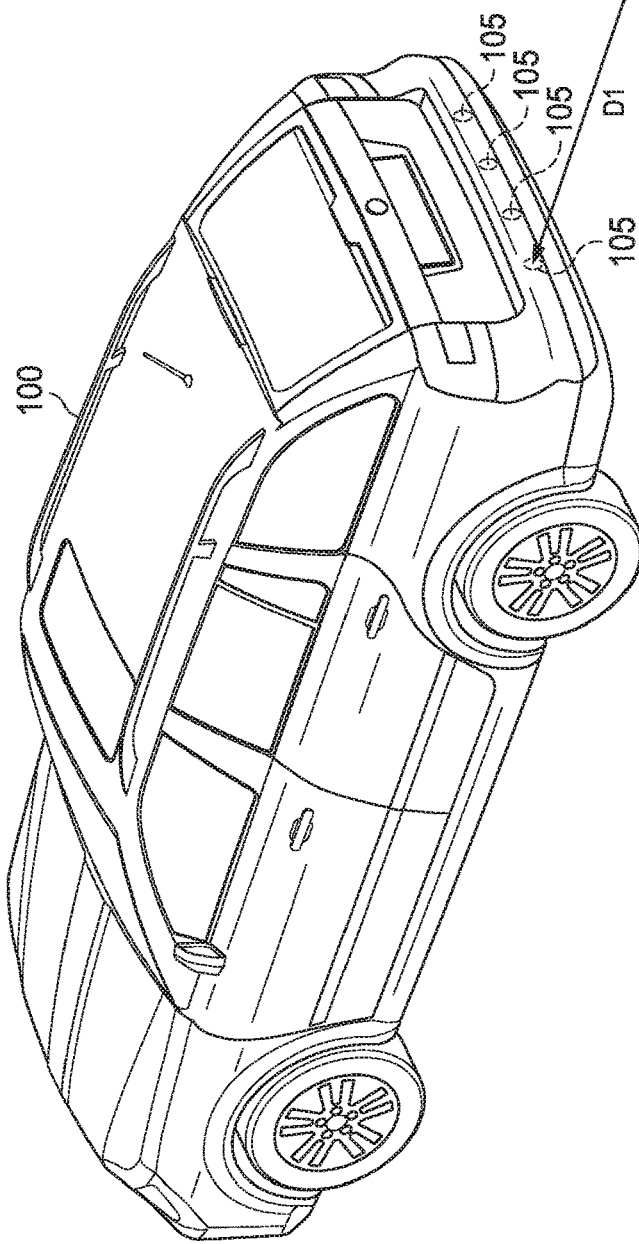
FIG. 1 illustrates an example automobile with ultrasonic transducers to measure distance to an object.

FIG. 1 illustrates the use of a distance measuring (i.e., ranging) system based on ultrasound, namely, in an automobile 100 that includes one or more ultrasonic transducers 105 in the front and/or rear bumpers. In the example of FIG. 1, four ultrasonic transducers 105 are shown, but the number of transducers in each bumper can be other than four in other examples. As used herein, "transducers" refers to ultrasonic transducers. Any single transducer can function both to emit ultrasonic signals, transducing electrical signals into acoustical signals, and to sense reflected signals, transducing acoustical signals into electrical signals. Each transducer 105 can, for example, emit sound waves and subsequently detect a reflection of the emitted sound waves after they have bounced off an object (e.g., object 120) and returned to the transducer. The elapsed time t between when the sound is first emitted from the transducer (the "burst") and when the reflected sound wave is detected back at the transducer can be measured by receiver circuitry coupled to the transducer. The total round-trip distance can be computed as the product of the speed of sound through air c (about 344 meters per second or 1,129 feet per second) and the measured time t. The distance D1 between the transducer and an object is then given by the formula $D1=ct/2$, where the division by two accounts for the fact that the reflected sound waves make a round trip back to the transducer.

In some examples, the sound wave signals are emitted as short bursts of sound at a specific frequency, typically above 20 kHz, e.g., at about 50 kHz. The emitted sound waves typically comprise a number of pulses, e.g., between about fifteen and one hundred pulses, e.g., between about twenty and sixty-five pulses. A controller (not shown in FIG. 1), which can, for example, implemented as an integrated circuit (IC) associated with and packaged with a single transducer 105, can drive the transducer 105 with an electrical driving signal. The transducer 105 can then convert the electrical driving signal into an acoustic sound wave emitted from the transducer. A controller directing its associated transducer to emit a burst is referred to herein as "bursting" the transducer. The transducer 105 converts a received reflected sound wave into an electrical signal and passes the transduced signal to a receiver in the controller configured to process the received signal. Internal to the controller is a timer that is started upon emission of the burst sequence, and, upon receipt of a valid echo, the value of the timer is recorded as the time-of-flight (ToF) of the echo. As noted above, this time-of-flight, divided by two and multiplied by the speed of sound in air, gives the distance between the transducer 105 and the reflecting object 120.

In coded-waveform burst signal systems and methods, rather than using a single-tone burst signal, a frequency-modulated or phase-modulated coded signal can be emitted by any one transducer, permitting disambiguation of return echoes resulting from multiple transducers.

In some examples that use such coding, each burst can consist, for example, of a pulse sequence resembling a square wave, but with each pulse in the waveform having a different duration corresponding to a different frequency. In some examples, the frequencies used to generate a given sound burst may range between a first frequency and second frequency and thus have a difference referred to as $\Delta f$. As an example, a first pulse in a burst can have a duration corresponding to a frequency of 48.0 kHz, a second pulse in the burst can have a duration corresponding to a frequency of 48.2 kHz, a third pulse in the burst can have a duration corresponding to a frequency of 48.4 kHz, and so on, until the twenty-first and last pulse in the burst, which can have a duration corresponding to a frequency of 52.0 kHz. The preceding represents but one example; other pulse frequencies and number of pulses per burst are also possible, as are arrangements of different-frequency pulses within the burst, beyond sequential frequency increase, as in this example, or, in other examples, frequency decrease, or frequency increase-then-decrease, or frequency decrease-then-increase.

Thus, in other examples, a burst can sweep up from a first frequency to a second, higher frequency and back down again to the first frequency or to a third frequency that is lower than the second frequency. In yet other examples, a burst can switch between two or more frequencies using a predefined pattern to create a unique coding signature. In still other examples, the burst can sweep down from a first frequency to a second, lower frequency and then back up to the first frequency or to a third frequency that is higher than the second frequency. Other modulation patterns are possible as well. Whatever the pattern, the particular sweep characteristics of the burst, in terms of pulse frequencies, number of pulses, time duration of pulses, and/or time-arrangement of pulses (e.g., by frequency, duration or otherwise) can act as a burst signature that is identifying of the transducer emitting the burst. Each transducer can have its own unique frequency modulation signature in the coded burst waveform it emits. Thanks at least in part to the above-described burst coding, no restriction need be placed on the overlapping of the frequency ranges of the sweep(s) in bursts from different transducers. Bursts can be phase-modulation-coded or frequency-modulation-coded.

Receiver circuitry in the controller associated with a particular transducer can be equipped with a correlator. The correlator can be provided with a template that can, for example, be sampled from a coded signal used to create the driving signal. Each transducer can thereby correlate only to its own template. Specifically, because each transducer has a distinct frequency or phase modulation pattern, each transducer's receiver circuitry is able to correlate a received signal only to that transducer's own frequency or phase modulation signature. Owing to the distinctness of the different transducers' bursts, the coded bursts can be emitted closer together in time than if uncoded. As each emitted sound signal is uniquely coded for a specific transducer 105, the reflected sound signals are unique as well, and can be differentiated by the receiver circuitry connected to each transducer.

The (full-length) receive template can be generated in one of several ways. In each case, the receive template is of fixed length N that approximately but not necessarily exactly matches the length of the burst signal (or the length of the burst signal plus a "dead zone" ringing period) M. As one example, the receive template can be computationally generated, e.g., in real time from the transmitted burst signal, e.g., by being resampled from the excitation signal (i.e., the transmitted burst signal) at a point prior to its transduction into an acoustic signal. In such a case, N is either equal to M or slightly less than M, depending on correlator implementation limitations. For example, it may be the case that the correlator template generation as implemented in hardware may result in the correlator template having a fixed maximum length, and M exceeds this maximum length for some transducer and receive sampling rate configurations.

Alternatively, the receive template can be generated based on the acoustic output of a coded burst driving signal. This can be done, for example, by measuring (e.g., with a microphone) and sampling (e.g., with an ADC) the transducer-output acoustic burst pattern and thereafter storing the generated template in memory for later use in correlation calculation. Another approach is to use another transducer and receiver circuit to record the template from the output of the receiver circuit. In this way, the recorded template also takes into account the receive response of the transducer and the response of the receiver circuit. Whichever way it is derived, a template that is generated from acoustic output (as opposed to one computationally generated by sampling the excitation signal) is capable of accounting for a post-burst period of ringing of the transducer (a "dead zone"). In such a case, N may be larger than M to account for some of ringing behavior of the transducer. The correlator template size in hardware can be configured to have a maximum length that accommodates this difference in size of N versus M. A template generated in this manner can perform better, e.g., in terms of signal-to-noise ratio (SNR), than a computationally generated template, because it matches the real acoustic signal going out of the transducer, not the electrical excitation signal. A method of template generation that involves a user (e.g., a systems integrator) measuring the acoustic burst pattern using a microphone and storing the template in a memory in the ranging device or system does not necessarily offer the simplicity of execution of dynamically computationally generating templates on the fly based on device configurations.

Figure 2:
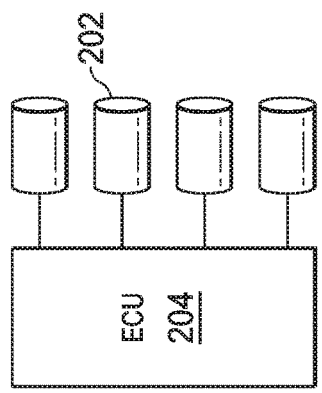
FIG. 2 is a high-level diagram showing an example organization between a central controller and a number of ultrasonic sensor modules each having an ultrasonic transducer and an electronic controller.

FIG. 2 shows the organization of a plurality of ultrasonic sensor modules 202 as directed by a central controller 204, e.g., an electronic control unit (ECU). Each sensor module 202 can comprise an associated individual controller (not specifically shown), which can be implemented, for example, as an integrated circuit (IC), and which is configured to drive an ultrasonic transducer (not specifically shown) in the sensor module 202 as well as to process a received signal that may contain echoes corresponding to targets or obstacles. After processing, the transducer-associated controller can send the processed echo information back to the central controller 204, which can collect processed echo information from multiple transducers (e.g., all four transducers, in the illustrated example) and triangulate the detected object based on the collected information from the multiple transducers. Central controller 204 can also perform some additional high-level processing, including processing to handle interference. In some examples, central controller 204 can include circuitry to compute the time of flight of detected echoes based on information sent from modules 202, e.g., envelope information or peak location information. In other examples, time of flight can be computed within an individual module 202 and transmitted to central controller 204.

Figure 3:
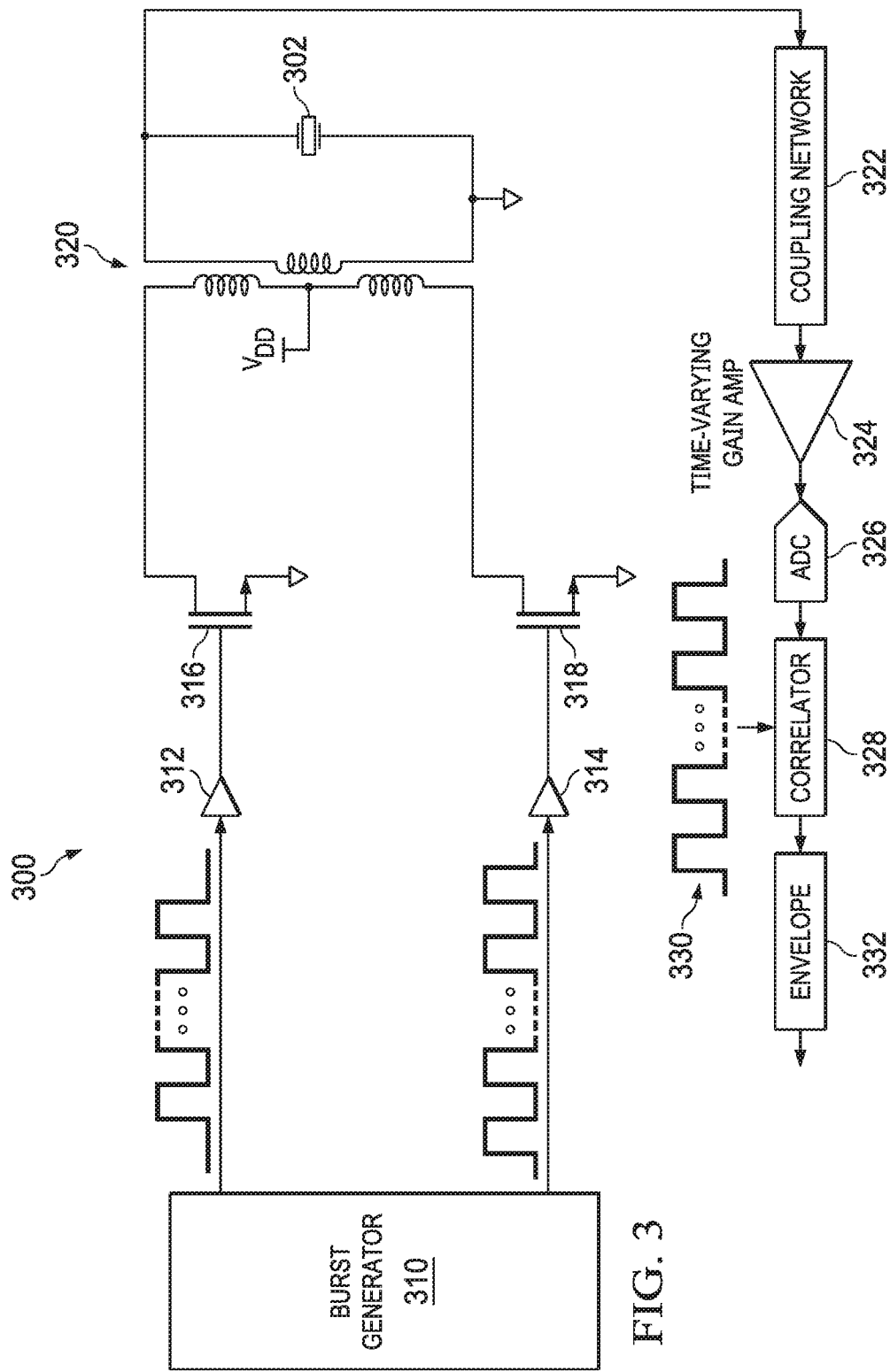
FIG. 3 is a block diagram of an example portion of a controller and an associated transducer in an ultrasonic sensing system.

FIG. 3 is a simplified diagram of an example system 300, or part thereof, for coded ultrasonic ranging, including an ultrasonic transducer 302 capable both of emitting coded ultrasonic signals based on electrical signals and listening for echoes to transduce them back to electronic signals. The upper portion of the diagram shows excitation circuitry constituting a transmission path, and the lower portion of the diagram shows listening circuitry constituting a receiver path. On the excitation circuitry side, burst generator 310 can generate a coded (e.g., frequency-modulated) excitation signal that drives two sides of transformer 320 via drivers 312, 314 and field-effect transistors (FETs) 316, 318. On the other side of transformer 320 is transducer 302. During excitation, the transformer 320 drives transducer 302 to emit a coded ultrasonic burst. Once the excitation stops, there will be a period of transducer ringing, following which the transducer 302 may start to receive echoes that may be reflected back toward the system 300 from one or more targets in the environment, such as target 120 shown in FIG. 1.

On the listening circuitry side, a received acoustical signal can be transduced into an analog electrical signal by transducer 302 and can subsequently be fed to a coupling network 322 and a time-varying gain (TVG) amplifier 324, whereupon it can be sampled by an analog-to-digital converter 326. The sampled signal can then correlated with a transmit template 330 by correlator 328. Transmit template 330 can be, for example, computationally generated from the burst signal produced by burst generator 310 that drives the transducer 302, or can be retrieved from a memory after having been previously acoustically sampled, as described above. After the correlator, an envelope extractor 332 can extract envelope information from the correlated signal that can be compared with a threshold to give the time-of-flight information. The threshold can be set, for example, to be higher than a certain noise level so as to avoid false positive triggering of object detection from underlying electrical noise in the received signal path or acoustic noise in the environment. In certain cases, it may also be desirable to avoid triggering from certain types of objects and/or objects at certain distances. The threshold can be set higher to suppress detection of such objects. The threshold need not be a value that is constant with respect to time, but itself can be a time-varying signal that can be pre-defined and/or generated dynamically.

The system 300 can be configured to accommodate any number of different codes (e.g., four codes) by implementing additional parallel processing receiver paths between analog-to-digital converter 326 and a peak rank stage (not shown) that follows the envelope generator 332, one such path for each code. This basic system 300 for coded ultrasonic transmission enables simultaneous sensor bursting, increasing scan time while improving signal-to-noise ratio and echo stability.

Figure 4:
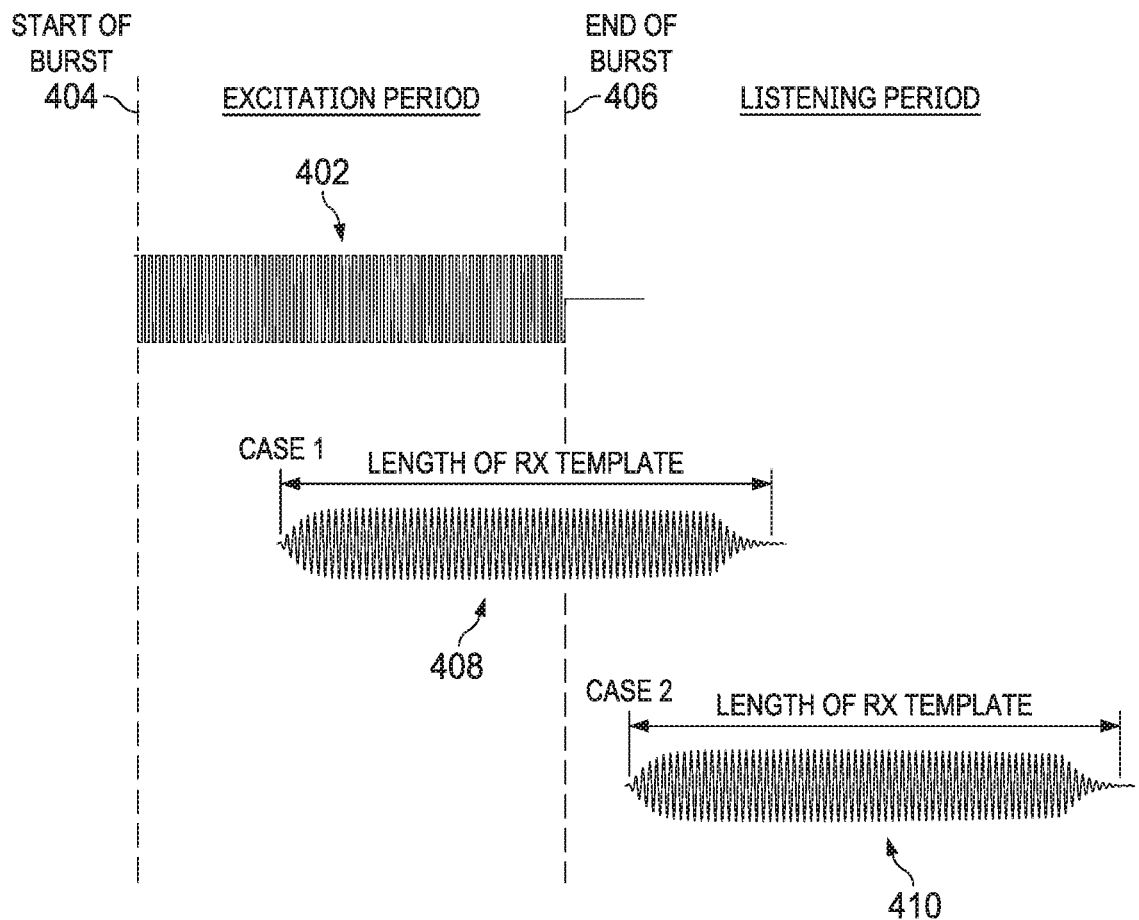
FIG. 4 is a waveform timing diagram of an example burst signal and corresponding example receiver templates.

The problem addressed by the presently described systems and methods is illustrated in FIG. 4, which shows three example time-domain acoustic waveforms 402, 408, 410 as transduced by a transducer such as transducer 302. Coded burst signal 402, which can also be referred to as an excitation signal, starts at an excitation start time 404 and concludes at an excitation end time 406. The duration of the illustrated burst signal 402 is about 64 pulses, or about 1.2 milliseconds at about 55 kilohertz on average, but may be of different duration, number of pulses, or average frequency in other examples. As described above, a received signal is correlated with a template that identifies the coding of the burst signal, and which can be generated from the burst signal. The identified problem is that targets a short distance from the ranging system generate echoes returned before the end of a burst, a large part of which are effectively not received by the ranging system because such part falls within the excitation period rather than the subsequent listening period.

In case 1 of the illustrated example of FIG. 4, a target object that is 10 centimeters away from the bursting transducer returns a first echo signal 408 starting 588 microseconds after the beginning of the excitation signal 402, the sound speed being 340 meters per second. Thus, first echo signal 408 partially overlaps in time with the excitation signal 402. Because the transducer that produces the burst signal 402 is driven by the transformer during excitation, an electrical signal is directly coupled to the receiver side of the system before the end of the burst, and therefore, the system is unable to effectively listen for an echo until some time after the excitation has been completed at excitation end time 406. As described above, in previously described systems and methods for coded ultrasonic ranging, the receive template approximately matches the length of its corresponding burst signal. However, in case 1 of FIG. 4, the full receive template for burst signal 402, which is of the length indicated above received signal 408, does not correlate well to received signal 408 given that only a portion of received signal 408 received after time 406 is "heard" (i.e., transduced into an electrical signal for correlation and peak detection). It would therefore be desirable, in case 1, for received echo 408 to be correlated to a template that corresponds in length only to the portion of echo 408 "heard" by the system.

By contrast, case 2 of FIG. 4 illustrates an echo 410 of burst signal 402 received from a target object 25 centimeters distant from the bursting transducer at 1.47 milliseconds after the start of burst signal 402 (of duration 1.2 milliseconds), such that received signal 410 well clears the time after the end of the burst 406 and is fully within the listening period of the transducer. In case 2, then, it would be desirable for received echo 410 to be correlated to a full-length template that corresponds in length to the full portion of echo 410 "heard" by the system, i.e., to the full length of burst signal 402. Whereas in case 1, it would be desirable for the template to only be "active" after the end of the burst 406, in case 2, it would be desirable for the template to be active for its entire length.

Figure 5:
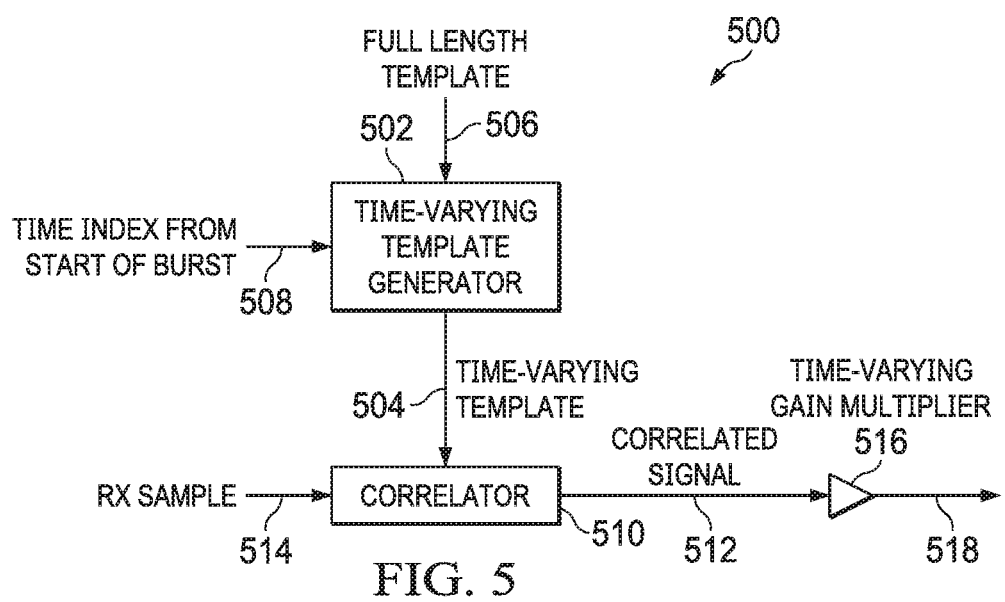
FIG. 5 is a block diagram of a time-varying template generator coupled to a correlator.

The block diagram 500 of FIG. 5 illustrates an example receive template generator that can time-vary the length of the receive template based on the time elapsed to generate a receive template of a length that more perfectly matches the length of an expected "heard" echo signal. Rather than delivering in all circumstances a full-length template of static length to a correlator, as in FIG. 3, time-varying template generator 502 can output a time-varying template 504 that can be based on the full-length template 506 and a time index 508 measured from the start of the burst. It is then this time-varying template 504 that can be delivered to the correlator 510, which can correspond to correlator 328 in FIG. 3. Correlator 510 can provide a correlator output signal 512 based on the time-varying template 504 and the sampled received signal 514. TVG multiplier 516 (not present in FIG. 3 and not to be confused with TVG amplifier 324) can also be included to apply a time-varying gain to the correlator output to adjust any gain variation due to varying template size, prior to delivery of the TVG-adjusted correlator output 518 to an envelope extractor such as envelope extractor 332 shown in FIG. 3.

As an example illustrating how time-varying template generator 502 can compute the length of the template to be output 504, where burst length is M in terms of receive samples, then for a template with full length N, the time-varying template at a time index n, where $M+1 \le n \le 2M$, is $$r(i) = \begin{cases} 0 & 1 \le i \le 2M - n \\ r_0(i) & 2M - n + 1 \le i \le N \end{cases}$$

where $r_0(i)$ is the original full-length template 506 and i is the template index. Note that N can be larger than M in the case where some portion of the transducer ringing is also included in the template used for correlation. As described above, the template in such case can be constructed and stored in memory, rather than being computationally generated in real time from the excitation signal. When $n \ge 2M+1$, the template is equal to $r_0(i)$. It has a fixed length and is no longer time-varying. When $n < M+1$, the template can be the full template or an incomplete template under the circumstance that the template is still being generated. It is not critical that the template be fully generated in such circumstance because the correlator output is based on electrical signal coupling and is not from the reflected echoes of an object. In other words, the system may not be "listening" for echoes with a transducer during $n < M+1$ because the transducer is still bursting during this period.

To compensate for the gain difference due to varying template length, TVG 516 can provide the following gain compensation g(n) at a time index n, where $M+1 \le n \le 2M$:

$$g(n) = \frac{N}{n + N - 2M}$$

Thus, when the time index n is equal to twice the burst length M, i.e., when n=2M, the gain g(n) reaches N/N=1.

For example, for an M=64-pulse burst signal, the receive template length may be 64×7=448 (assuming the receive sampling rate is seven times the transducer's frequency). The normal template generation is complete at sample number 448. For the next received sample coming in at sample n=449, the receive template is all zero except the last value. The gain applied to the correlator output is 448. For the sample immediately following, i.e., n=450, the template is non-zero only for the last two values. The gain applied to the correlator output is 224. This continues until sample n=448×2, at which point the template is full again, and the gain applied to the correlator output is 1.

Figure 6:
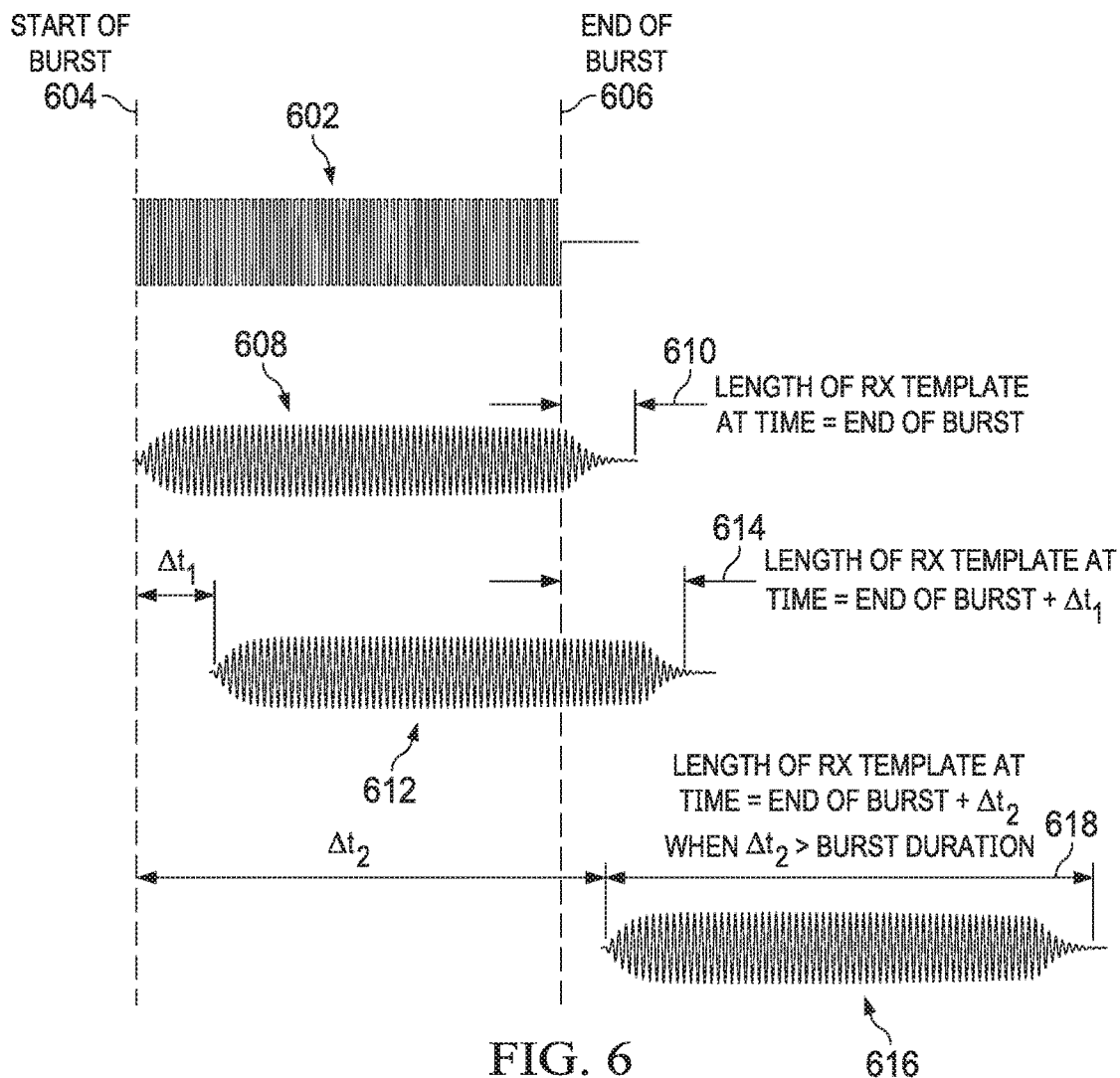
FIG. 6 is a waveform timing diagram of an example burst signal and corresponding example receiver templates.

FIG. 6 illustrates an example of how the arrangement 500 of FIG. 5 can provide adjusted lengths for receive templates, the lengths being adjusted based on the time elapsed since the end of a burst, such that a receive template grows in temporal length until it becomes its full length. Burst signal 602 is about 64 pulses, for a temporal length of about 1.2 milliseconds at an average frequency of about 55 kilohertz. Burst signal 602 begins at an excitation start time 604 and ends at an excitation end time 606. The full length of receive template 608 (corresponding to input full-length template 506 of FIG. 5) is shown; however, its computed length (e.g., as computed by the time-varying template generator 502) at the time of the end 606 of the burst 602 is as shown by length 610. For an echo 612 returned after time $\Delta t_1$ that is less than the duration of the burst 602, the computed length 614 of the receive template is the length 610 plus $\Delta t_1$. For an echo 616 returned after time $\Delta t_2$ that is greater than the duration of the burst 602, the computed length 618 of the receive template is its full length. The receive template is time-varying from the end of the burst until one burst interval after the end of the burst.

Figure 7:
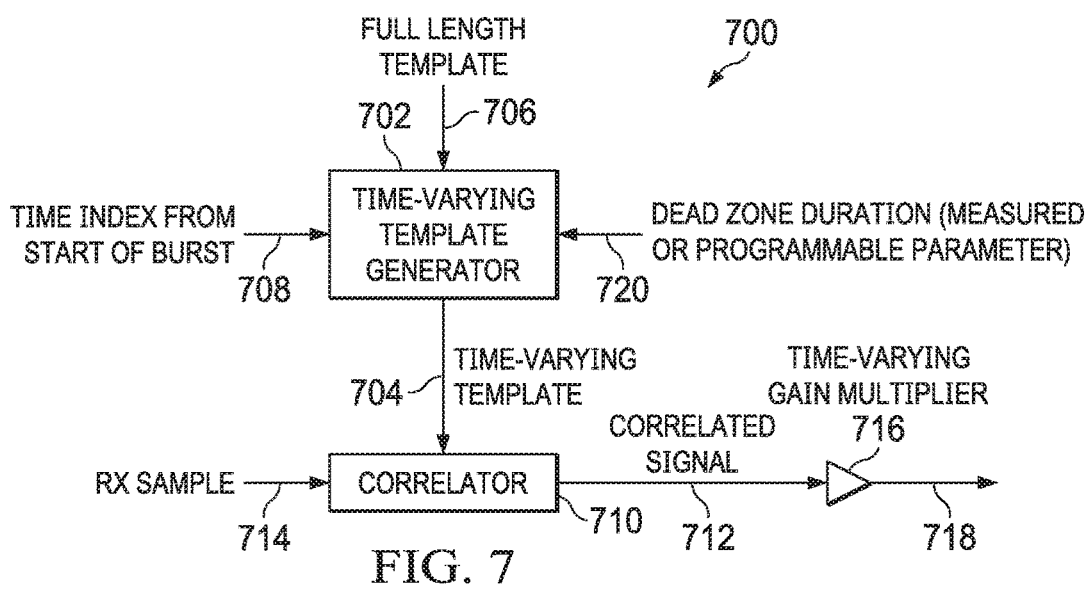
FIG. 7 is a block diagram of a time-varying template generator coupled to a correlator.

The block diagram 700 of FIG. 7 illustrates another example receive template generator that can time-vary the length of the receive template based on the time elapsed to generate a receive template of a length that more perfectly matches the length of an expected "heard" echo signal. Rather than delivering in all circumstances a full-length template of static length to a correlator, as in FIG. 3, time-varying template generator 702 can output a time-varying template 704 based on the full-length template 706, a time index 708 measured from the start of the burst, and a dead zone duration, which can be, for example, a programmed parameter based on measurements to determine how long a transducer rings after it has been burst. The resultant time-varying template 704 can be delivered to the correlator 710, which can correspond to correlator 328 in FIG. 3. Correlator 710 can provide a correlator output signal 712 based on the time-varying template 704 and the sampled received signal 714. TVG multiplier 716 (not present in FIG. 3 and not to be confused with TVG amplifier 324) can also be included to apply a time-varying gain to the correlator output to adjust any gain variation due to varying template size, prior to delivery of the TVG-adjusted correlator output 718 to an envelope extractor such as envelope extractor 332 shown in FIG. 3.

As an example illustrating how time-varying template generator 702 can compute the length of the template to be output 704, where M is the burst length plus the dead zone duration in terms of receive samples, time-varying template generator 702 can be configured to consider two separate cases, the first where template length N is greater than or equal to M, and the second case where template length N is less than M.

If N≥M, which is to say, the full template length is greater than or equal to the burst length, then for a receive template with full length N, the time-varying template at a time index n, where M+1≤n≤2M, is $$r(i) = \begin{cases} 0 & 1 \le i \le 2M - n \\ r_0(i) & 2M - n + 1 \le i \le N \end{cases}$$

where $r_0(i)$ is the original full-length template 706 and i is the template index. When n≥2M+1, the template is equal to $r_0(i)$. It has a fixed length and is no longer time-varying.

To compensate for the gain difference due to varying template length, TVG 716 can provide the following gain compensation g(n) at a time index n, where M+1≤n≤2M:

$$g(n) = \frac{N}{n + N - 2M}$$

If N<M, which is to say, the full template length is less than the burst length, then for a receive template with full length N, the time varying template at a time index n, where 2M−N+1≤n≤2M, is $$r(i) = \begin{cases} 0 & 1 \le i \le 2M - n \\ r_0(i) & 2M - n + 1 \le i \le N \end{cases}$$

where $r_0(i)$ is the original full-length template and i is the template index. When n≥2M+1, the template is equal to $r_0(i)$. It has a fixed length and is no longer time-varying.

To compensate for the gain difference due to varying template length, TVG 716 can provide the following gain compensation at a time index n, where 2M−N+1≤n≤2M:

$$g(n) = \frac{N}{n + N - 2M}$$

Figure 8:
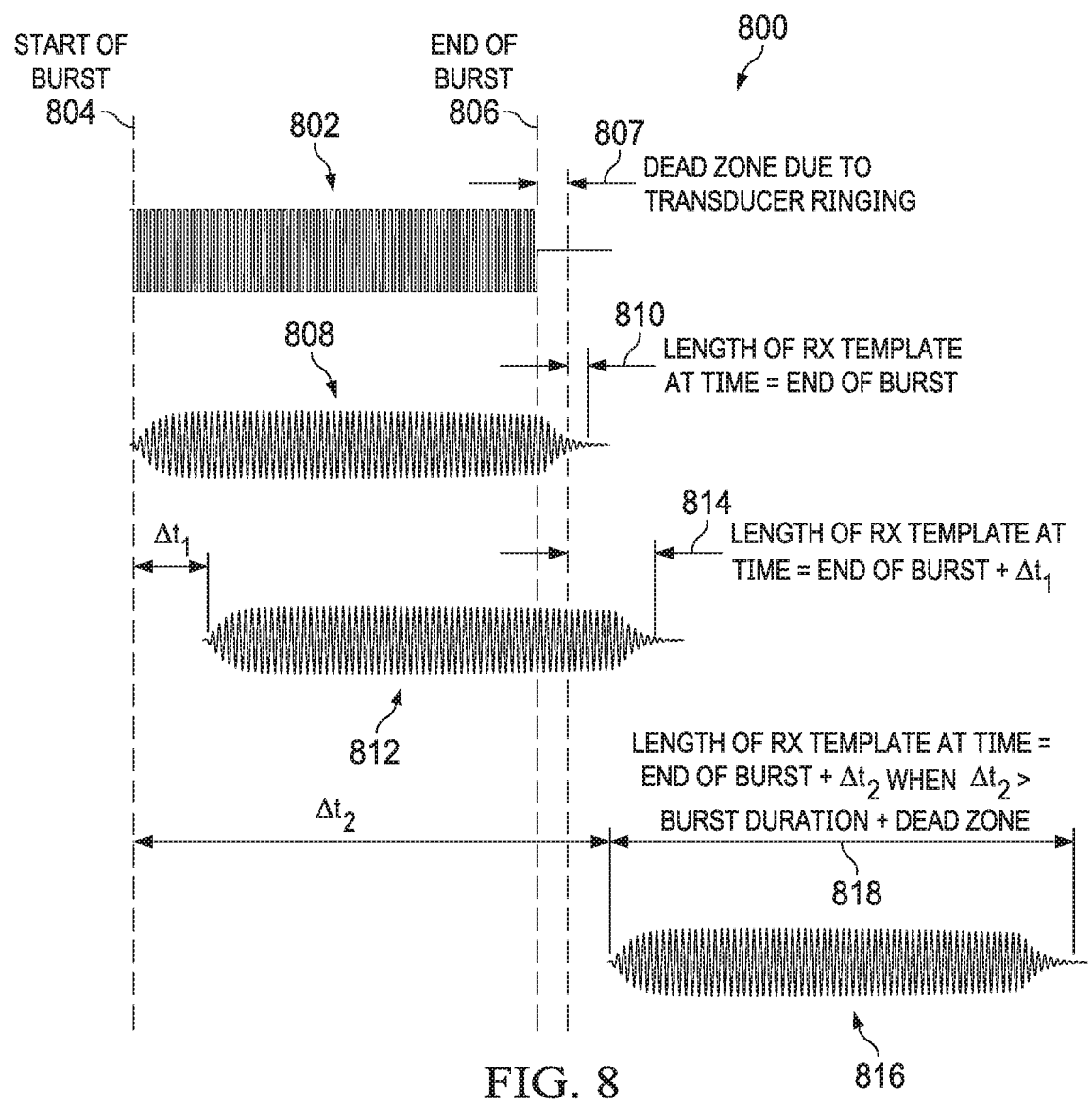
FIG. 8 is a waveform timing diagram of an example burst signal and corresponding example receiver templates.

FIG. 8 illustrates an example of how the arrangement 700 of FIG. 7 can provide adjusted lengths for receive templates, the lengths being adjusted based on the time elapsed since the end of a burst and the dead-zone duration, such that a receive template grows in temporal length until it becomes its full length. Burst signal 802 is about 64 pulses, for a temporal length of about 1.2 milliseconds at an average frequency of about 55 kilohertz. Burst signal 802 begins at an excitation start time 804 and ends at an excitation end time 806. A dead zone due to transducer ringing lasts for the indicated period of time 807 after the conclusion of the end 806 of the burst 802. The full length of receive template 808 (corresponding to input full-length template 706 of FIG. 7) is shown; however, its computed length (e.g., as computed by the time-varying template generator 702) at the time of the end 806 of the burst 802 is as shown by length 810. For an echo 812 returned after time $\Delta t_1$ that is less than the duration of the burst 802 plus the duration of the dead zone 807, the computed length 814 of the receive template is the length 810 plus $\Delta t_1$. For an echo 816 returned after time $\Delta t_2$ that is greater than the duration of the burst 802 plus the duration of the dead zone 807, the computed length 818 of the receive template is its full length. The receive template is time-varying from the end of the burst plus the duration of a dead zone until one burst interval after the end of the burst.

Figure 9:
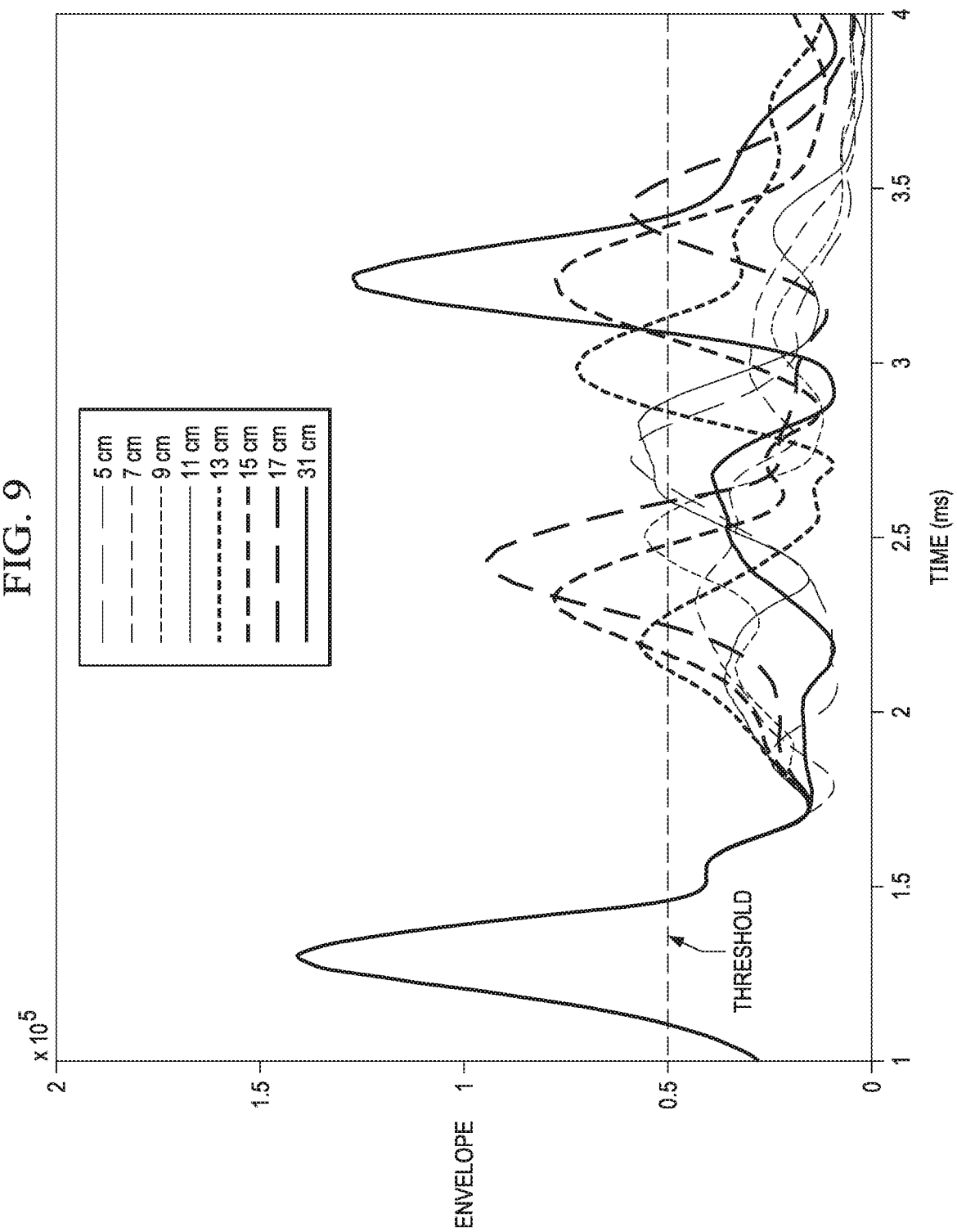
FIGS. 9 and 10 are temporal plots of example transduced received echo signals.
Figure 10:
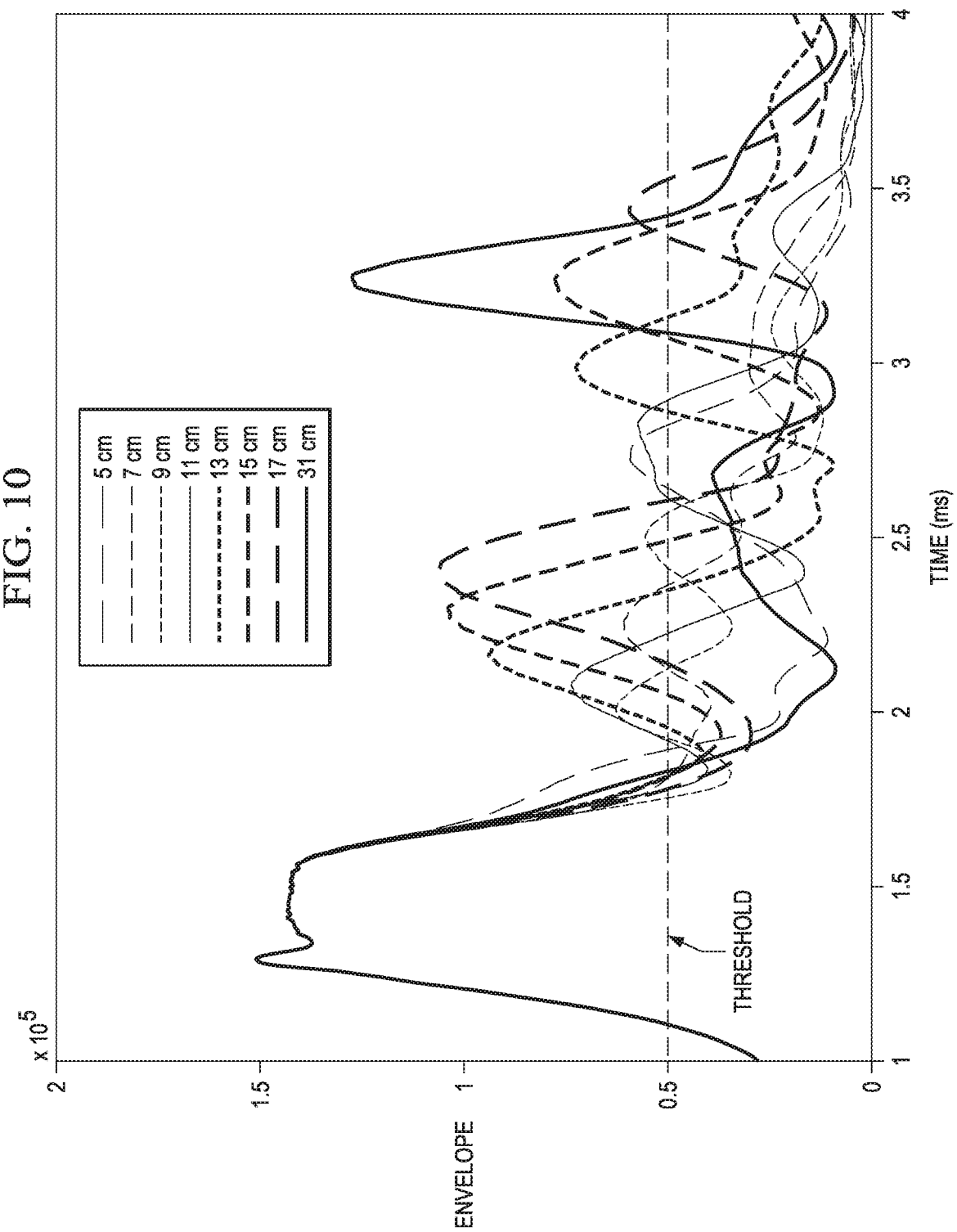

The graphs of FIGS. 9 and 10 illustrate a correlator output comparison for a 64-pulse chirp burst signal. FIG. 9 shows the results of a fixed-length template, whereas FIG. 10 shows the results of a time-varying template generated as described above. Different curves plotted in each graph correspond to envelopes the result from echoes from target objects at different distances, as indicated in the respective legends of each graph. For a threshold set at $5 \times 10^4$, the short distance ranging improves from about 13 centimeters to about 9 centimeters with a time-varying template design of the type described herein.

With regard to the frequency of update of the template r(i) (i.e., the length of the template) performed by template generator 502 or 702 and/or its gain factor g(n) performed by TVG 516 or 716, in some examples, the template length and/or its gain can be updated every sample, whereas in other examples, the template length and/or its gain can be updated with lesser frequency, for example, every 8 samples, to reduce computation cost. In such examples the template length and/or its gain can be set according to a template that terminates in the center of an 8-sample window. For example, for a template with full length N, the time-varying template $r_t(i)$ at a time index N+1 to N+8 can be computed as $$r_t(i) = \begin{cases} 0 & 1 \le i \le N - 4 \\ r_0(i) & N - 3 \le i \le N \end{cases}$$

where $r_0(i)$ is the original full-length template. The gain $g(n)$ can be computed as N/4 because the template has 4 values. The next time the template length/gain will be updated is at a time index N+9 to N+16. The time-varying template $r_t(i)$ at a time index N+9 to N+16 can be computed as $$r_t(i) = \begin{cases} 0 & 1 \leq i \leq N-12 \\ r_0(i) & N-11 \leq i \leq N \end{cases}$$

The gain $g(n)$ in this case is N/12 because the template has 12 values.

Figure 11:
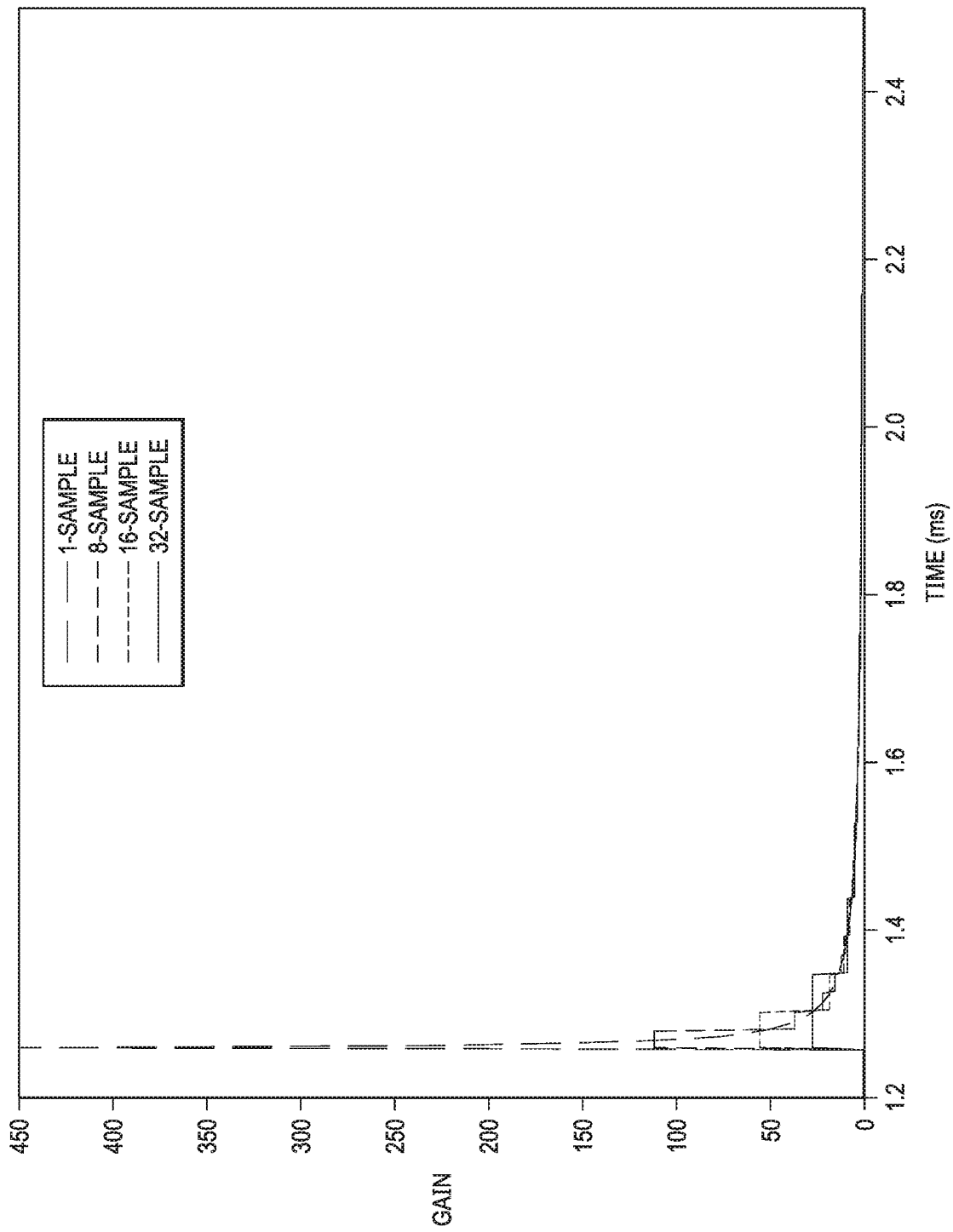
FIG. 11 is a graph showing an example gain profile for different template-update segment lengths.
Figure 12:
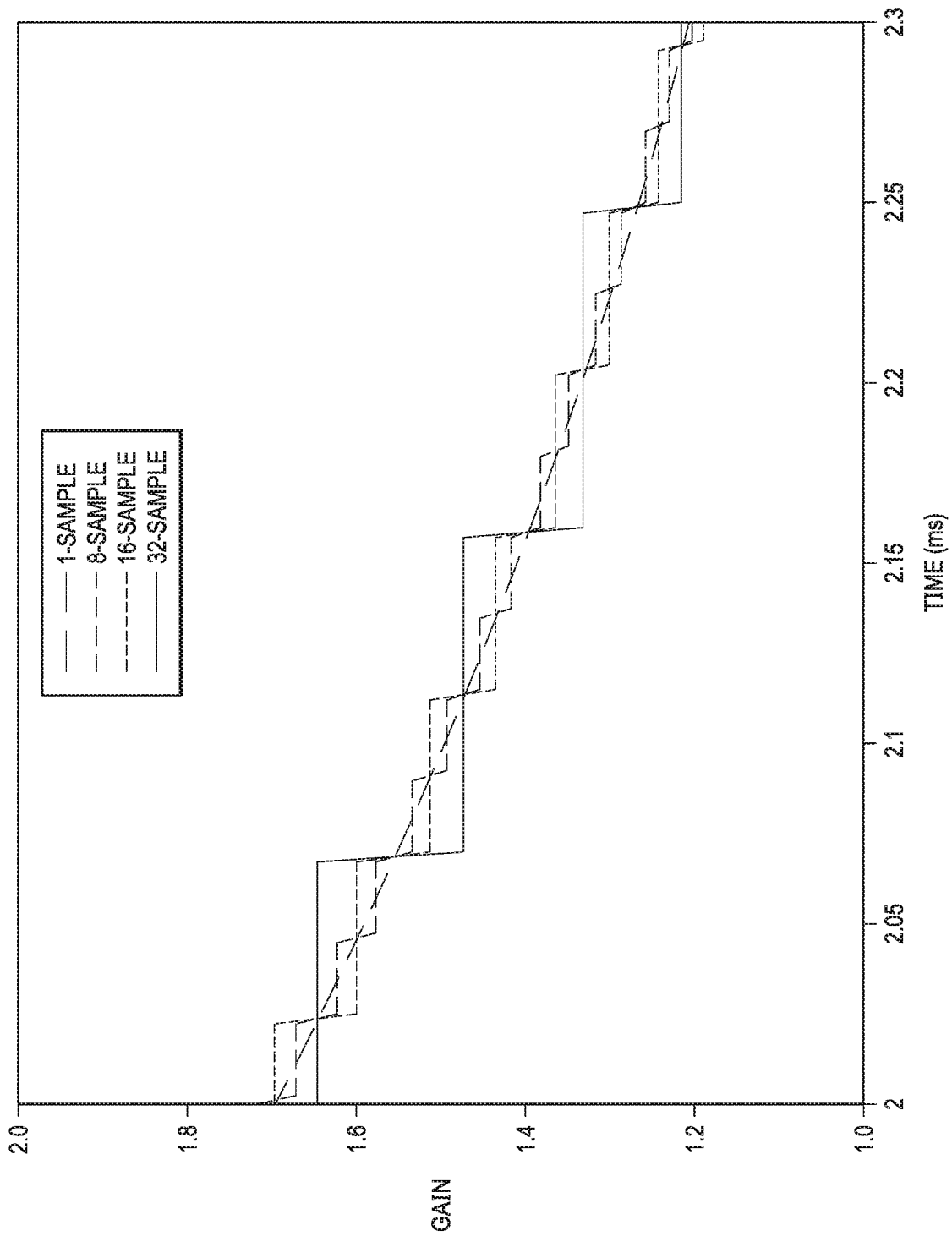
FIG. 12 is a magnified view of the graph of FIG. 11.

Further with respect to this frequency of template length/gain update, FIGS. 11-14 show the gain profiles and envelope outputs for a 13-centimeter distant target for a variety of segment sizes (i.e., a 1-sample segment, an 8-sample segment, a 16-sample segment, and a 32-sample segment). In the illustrated plots, with a 1-sample segment, the receive template length and its time-varying gain are updated every 1 sample, whereas with a 32-sample segment, the receive template length and its time-varying gain are updated every 32 samples. FIG. 11 shows the gain profile for different segment lengths. FIG. 12 is a magnified view of FIG. 11, showing the gain profile zoomed in from 2 milliseconds to 2.3 milliseconds. As can be seen in FIGS. 11 and 12, a less-frequent update (i.e., larger number of samples per segment) will maintain a fixed gain for a longer period of time, whereas a more-frequent update will result in a smoother gain curve.

Figure 13:
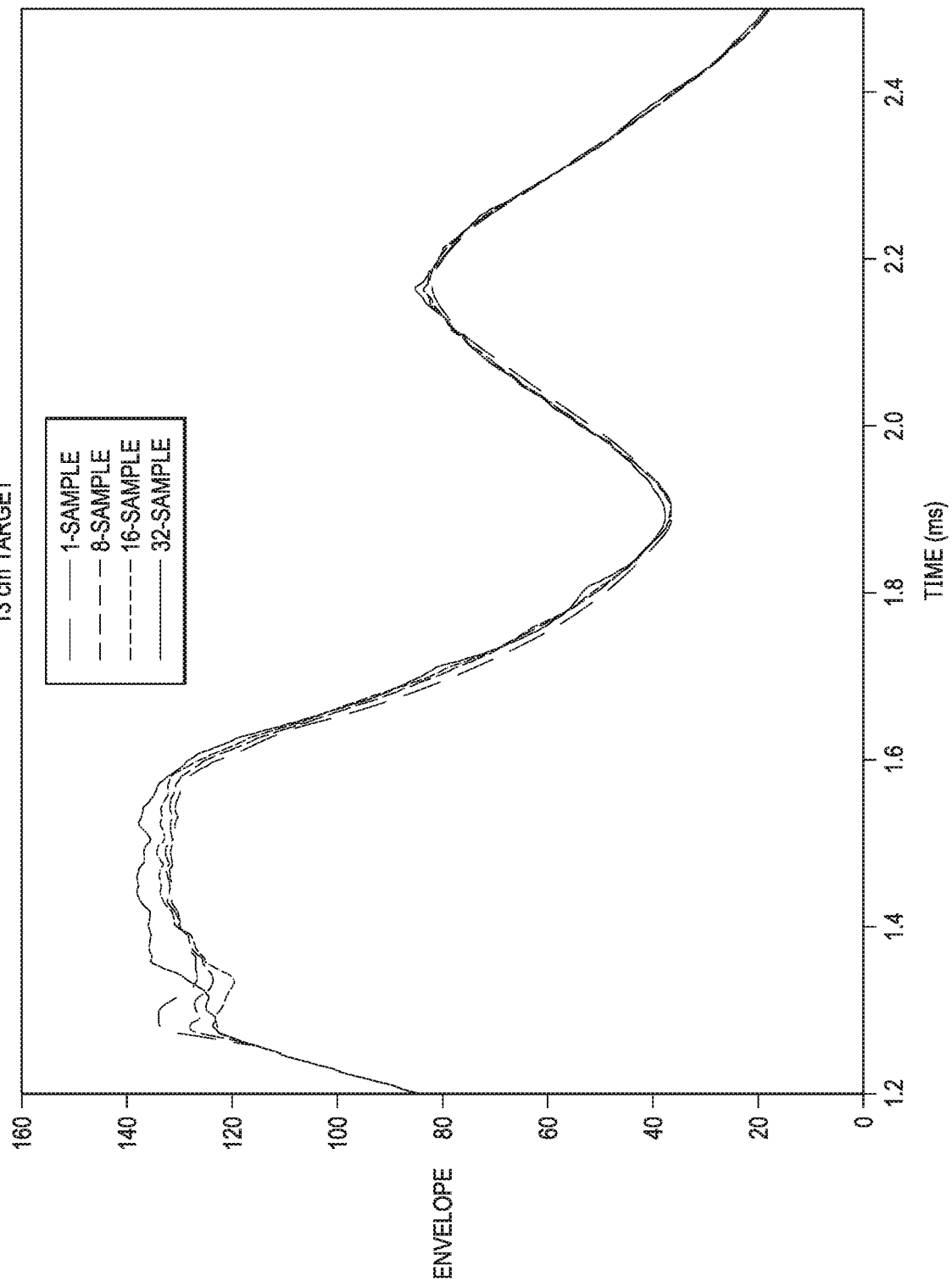
FIG. 13 is a graph showing envelopes for the plots of FIG. 11 for a 64-pulse chirp burst signal.
Figure 14:
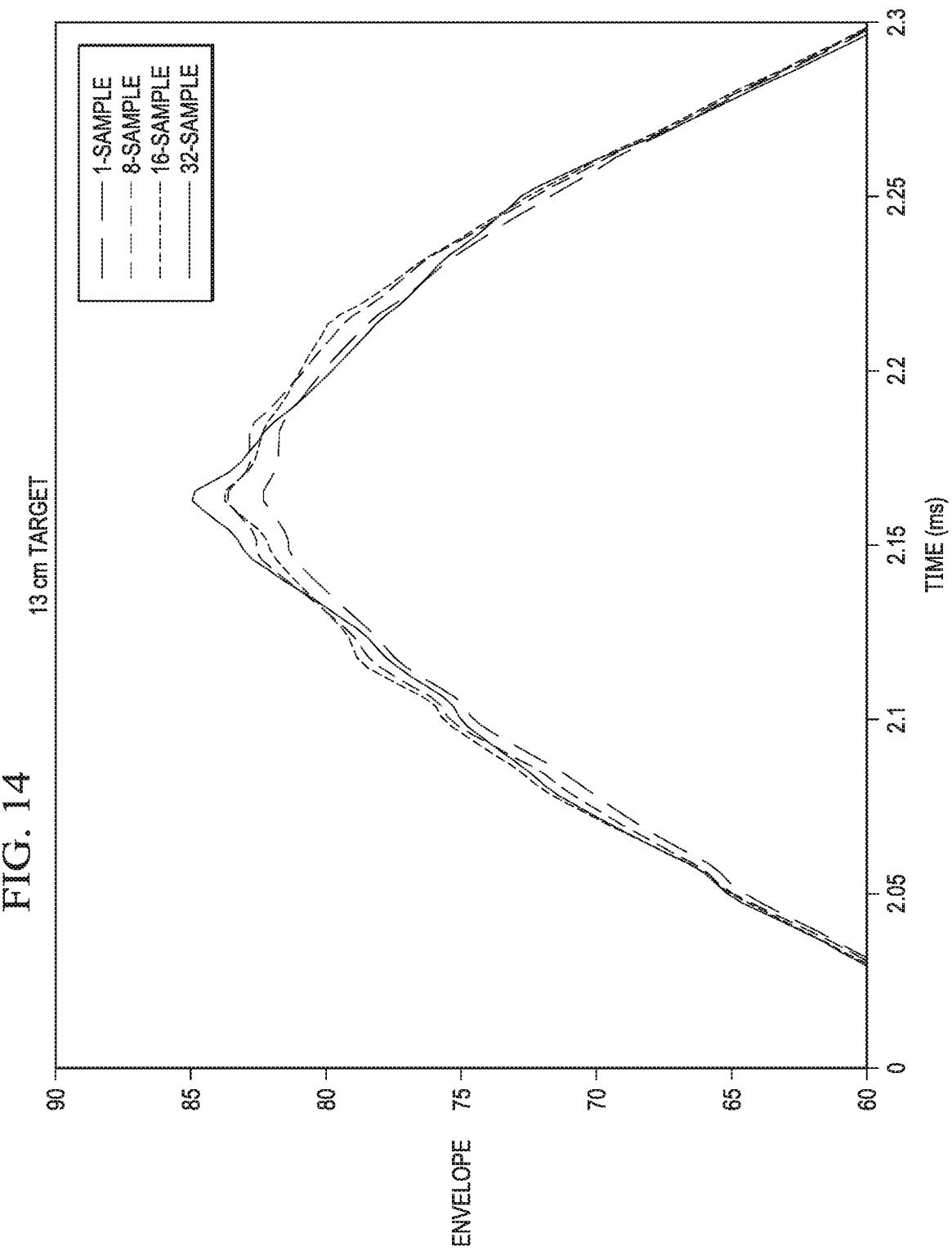
FIG. 14 is a magnified view of the graph of FIG. 13.

FIGS. 13 and 14 show the effects of update frequency on measured echoes. FIG. 13 shows envelopes for the plots of FIG. 11 for a 64-pulse chirp burst signal. What may appear to be peaks in the part of the envelopes between 1.2 milliseconds and 1.6 milliseconds in FIG. 13 can be attributed to transducer ringing rather than to detected acoustic reflection. The peak centered at about 2.16 milliseconds is indicative of an echo from an object 13 centimeters away. FIG. 14 is a magnified view of FIG. 13, showing zoomed-in envelopes for a 13-centimeter echo of a 64-pulse chirp burst signal at the peak between 2.0 and 2.3 milliseconds. From the plots of FIGS. 11-13, significant distortions to the echo signal can be noted with a 32-sample segment. Although hardware tradeoff analysis may be determinative of the precise segment sample size used in any individual case, in some examples, an 8-sample segment will be found to be optimal. In the case of 128 pulses, the oversample ratio is 3.5×.

Further hardware implementation efficiencies can be realized by quantizing the time-varying gain applied to a time-varied-length receive template to an appropriate or optimal number of bits. In the case of a 64-pulse burst signal (64×7=448 template samples) and 8-sample segment, the maximum gain is 448/4=112. The various levels of gain to be applied can be expressed as a floating-point number or using a lesser number of bits representing integer and fractional parts of the gain level. The integer part of this gain can, for example, be 7 bits, while the fractional part can be, for example, 2, 3, or 4 bits. The integer bit width can be reduced by increasing the length of the first template, which reduces the gain, but this can have the drawback of creating a small notch in the envelope. Note that in these plots, the subsequent templates after the first template are set with length 1-sample.

Figure 15:
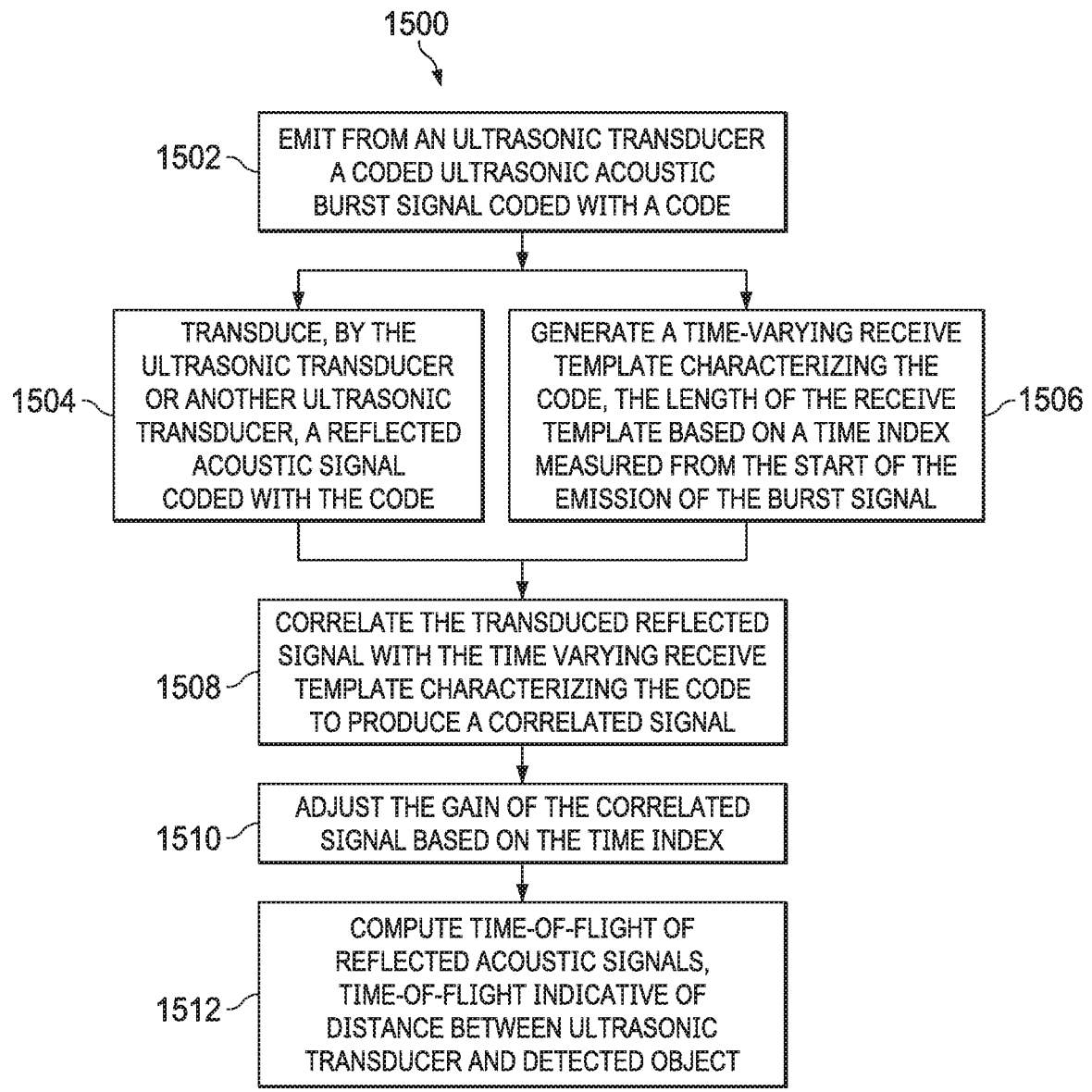
FIG. 15 is a flow chart illustrating an example method of coded ultrasonic ranging with time-varying template generation.

FIG. 15 illustrates an example method 1500 of ultrasonic detection. An ultrasonic transducer can emit 1502 a coded ultrasonic acoustic burst signal, coded with a code. In the presence of an object that reflects the emitted burst signal, the ultrasonic transducer (or a different ultrasonic transducer) can transduce 1504 a reflected acoustic signal coded with the code. A time-varying receive template characterizing the code can be generated 1506, the length (i.e., the temporal length or sample length) of the receive template being based on the length of time elapsed from the start of the emission of the burst signal. (As used herein, the meaning of a "time elapsed the start of the emission of the burst signal" is inclusive of a time index measured from the start of the burst. Thus, a receive template length based on a sample number can be considered to be "a receive template length based on a length of time elapsed," even if a time in seconds is not measured as part of the method 1500.) The transduced reflected signal can be correlated 1508 with the time-vary receive template characterizing the code to produce a correlated signal. The gain of this correlated signal can be adjusted 1510 based on the length of time elapsed since the start of the emission of the burst signal. The time of flight of the reflected acoustic signal can be computed 1512, this time of flight being indicative of the distance between the ultrasonic transducer and a detected object. This method can be carried out, for example, by an ultrasonic detection system that includes some or all of the components illustrated in FIGS. 1, 2, 3, 5, and/or 7.

The coded burst signal in method 1500 can be frequency-modulation coded or phase-modulation coded. The use of the time-varying template in method 1500 usefully improves short-range ultrasonic detection.

The systems described herein can be implemented, and the methods described herein can be carried out, using an application-specific integrated circuit (ASIC) or multiple ASICs. In some examples, the systems and methods can be implemented or carried out using a general-purpose digital electronic computer programmed to carry out the signal processing involved in the correlator, envelope stage, threshold stage, peak search stage, peak buffer stage, peak rank stage, and time-of-flight generation stage as software instructions.

In this description, the term "based on" means based at least in part on. In this description, the term "couple" or "couples" means either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. A method of ultrasonic ranging comprising:
emitting from an ultrasonic transducer a coded ultrasonic acoustic burst signal coded with a code;
transducing, by the ultrasonic transducer or another ultrasonic transducer, a reflected acoustic signal coded with the code;
generating a time-varying receive template characterizing the code, the length of the receive template being based on a time index measured from the start of emission of the burst signal;
correlating the transduced reflected acoustic signal with the time-varying receive template to produce a correlated signal; and
computing, based on the correlated signal, a time of flight of the reflected acoustic signal, the time of flight being indicative of a distance between the ultrasonic transducer and a detected object;
the time-varying receive template being generated further based on a full-length template that is resampled from a coded excitation signal at point prior to its transduction into the coded ultrasonic acoustic burst signal;
the time-varying receive template r(i) being generated between the time index n=M+1 and the time index n=2M, inclusive, as $$r(i) = \begin{cases} 0 & 1 \le i \le 2M - n \\ r_0(i) & 2M - n + 1 \le i \le N \end{cases}$$

where i is a template index, n is the time index, M is a length in samples of the burst signal, and N is a length in samples of the full-length template.

2. A method of ultrasonic ranging comprising:
emitting from an ultrasonic transducer a coded ultrasonic acoustic burst signal coded with a code;
transducing, by the ultrasonic transducer or another ultrasonic transducer, a reflected acoustic signal coded with the code;
generating a time-varying receive template characterizing the code, the length of the receive template being based on a time index measured from the start of emission of the burst signal;
correlating the transduced reflected acoustic signal with the time-varying receive template to produce a correlated signal; and
computing, based on the correlated signal, a time of flight of the reflected acoustic signal, the time of flight being indicative of a distance between the ultrasonic transducer and a detected object;
the time-varying receive template being generated further based on a full-length template that is generated by sampling acoustic output of the coded ultrasonic acoustic burst signal including a period of transducer ringing that follows the end of the acoustic burst signal;
the time-varying receive template r(i) being generated between the time index n=M+1 and the time index n=2M, inclusive, as $$r(i) = \begin{cases} 0 & 1 \le i \le 2M - n \\ r_0(i) & 2M - n + 1 \le i \le N \end{cases}$$

where i is a template index, n is the time index, M is a length in samples of the burst signal inclusive of the period of transducer ringing, and N is a length in samples of the full-length template, based on N≥M.

3. A method of ultrasonic ranging comprising:
emitting from an ultrasonic transducer a coded ultrasonic acoustic burst signal coded with a code;
transducing, by the ultrasonic transducer or another ultrasonic transducer, a reflected acoustic signal coded with the code;
generating a time-varying receive template characterizing the code, the length of the receive template being based on a time index measured from the start of emission of the burst signal;
correlating the transduced reflected acoustic signal with the time-varying receive template to produce a correlated signal; and
computing, based on the correlated signal, a time of flight of the reflected acoustic signal, the time of flight being indicative of a distance between the ultrasonic transducer and a detected object;
the time-varying receive template being generated further based on a full-length template that is generated by sampling acoustic output of the coded ultrasonic acoustic burst signal including a period of transducer ringing that follows the end of the acoustic burst signal;
the time-varying receive template r(i) being generated between the time index n=2M−N+1 and the time index n=2M, inclusive, as $$r(i) = \begin{cases} 0 & 1 \le i \le 2M - n \\ r_0(i) & 2M - n + 1 \le i \le N \end{cases}$$

where i is a template index, n is the time index, M is a length in samples of the burst signal inclusive of the period of transducer ringing, and N is a length in samples of the full-length template, based on N<M.

4. A method of ultrasonic ranging comprising:
emitting from an ultrasonic transducer a coded ultrasonic acoustic burst signal coded with a code;
transducing, by the ultrasonic transducer or another ultrasonic transducer, a reflected acoustic signal coded with the code;
generating a time-varying receive template characterizing the code, the length of the receive template being based on a time index measured from the start of emission of the burst signal;
correlating the transduced reflected acoustic signal with the time-varying receive template to produce a correlated signal; and
computing, based on the correlated signal, a time of flight of the reflected acoustic signal, the time of flight being indicative of a distance between the ultrasonic transducer and a detected object;
further comprising adjusting a gain of the correlated signal based on the time index;

the gain g(n) by which the correlated signal is adjusted between the time index n=M+1 and the time index n=2M, inclusive, being $$g(n) = \frac{N}{n+N-2M}$$

where n is the time index, M is a length in samples of the burst signal, and N is a length in samples of a full-length template upon which the time-varying receive template is based.

5. A method of ultrasonic ranging comprising:
emitting from an ultrasonic transducer a coded ultrasonic acoustic burst signal coded with a code;
transducing, by the ultrasonic transducer or another ultrasonic transducer, a reflected acoustic signal coded with the code;
generating a time-varying receive template characterizing the code, the length of the receive template being based on a time index measured from the start of emission of the burst signal;
correlating the transduced reflected acoustic signal with the time-varying receive template to produce a correlated signal; and
computing, based on the correlated signal, a time of flight of the reflected acoustic signal, the time of flight being indicative of a distance between the ultrasonic transducer and a detected object;
further comprising adjusting a gain of the correlated signal based on the time index;
the gain g(n) by which the correlated signal is adjusted between the time index n=2M−N+1 and the time index n=2M, inclusive, being $$g(n) = \frac{N}{n+N-2M}$$

where n is the time index, M is a length in samples of the burst signal, and N is a length in samples of a full-length template upon which the time-varying receive template is based, based on N<M.

6. An ultrasonic detection system comprising:
excitation circuitry configured to induce an ultrasonic transducer to emit a coded ultrasonic acoustic burst signal, coded with a code;
listening circuitry configured to the receive from the ultrasonic transducer or another ultrasonic transducer a transduced reflected acoustic signal coded with the code;
a time-varying template generator configured to generate a time-varying receive template characterizing the code, based on a time index measured from the start of emission of the burst signal;
a correlator coupled to the listening circuitry and to the time-varying template generator and configured to correlate the transduced reflected signal with the time-varying receive template to produce a correlated signal; and
time-of-flight circuitry coupled to the correlator and configured to compute a time of flight of the reflected acoustic signal based on the correlated signal, the time of flight being indicative of a distance between the ultrasonic transducer and a detected object;
the time-varying template generator being configured to generate the time-varying receive template further based on a full-length template that is resampled from a coded excitation signal at point prior to its transduction into the coded ultrasonic acoustic burst signal;
the time-varying template generator being configured to generate the time-varying receive template r(i) between the time index n=M+1 and the time index n=2M, inclusive, as $$r(i) = \begin{cases} 0 & 1 \le i \le 2M-n \\ r_0(i) & 2M-n+1 \le i \le N \end{cases}$$

where i is a template index, n is the time index, M is a length in samples of the burst signal, and N is a length in samples of the full-length template.

7. An ultrasonic detection system comprising:
excitation circuitry configured to induce an ultrasonic transducer to emit a coded ultrasonic acoustic burst signal, coded with a code;
listening circuitry configured to the receive from the ultrasonic transducer or another ultrasonic transducer a transduced reflected acoustic signal coded with the code;
a time-varying template generator configured to generate a time-varying receive template characterizing the code, based on a time index measured from the start of emission of the burst signal;
a correlator coupled to the listening circuitry and to the time-varying template generator and configured to correlate the transduced reflected signal with the time-varying receive template to produce a correlated signal; and
time-of-flight circuitry coupled to the correlator and configured to compute a time of flight of the reflected acoustic signal based on the correlated signal, the time of flight being indicative of a distance between the ultrasonic transducer and a detected object;
the time-varying template generator being configured to generate the time-varying receive template further based on a full-length template that is generated by sampling acoustic output of the coded ultrasonic acoustic burst signal including a period of transducer ringing that follows the end of the acoustic burst signal;
the time-varying template generator being configured to generate the time-varying receive template r(i) between the time index n=M+1 and the time index n=2M, inclusive, as $$r(i) = \begin{cases} 0 & 1 \le i \le 2M-n \\ r_0(i) & 2M-n+1 \le i \le N \end{cases}$$

where i is a template index, n is the time index, M is a length in samples of the burst signal inclusive of the period of transducer ringing, and N is a length in samples of the full-length template, based on N≥M.

* * * * *